Oct. 22, 1968

G. H. SHRIVER ET AL  3,406,506

TOBACCO HARVESTER WITH MECHANISM FOR ORIENTING
LEAVES BEFORE DEFOLIATION

Filed July 25, 1966

INVENTORS.
G. HARVEY SHRIVER
CLARENCE L. SHAEFFER

BY

ATTORNEY

United States Patent Office 3,406,506
Patented Oct. 22, 1968

3,406,506
TOBACCO HARVESTER WITH MECHANISM FOR ORIENTING LEAVES BEFORE DEFOLIATION
George Harvey Shriver, Moline, and Clarence Lee Shaeffer, East Moline, Ill., assignors to Deere & Company, Moline, Ill., a corporation of Delaware
Filed July 25, 1966, Ser. No. 567,663
9 Claims. (Cl. 56—27.5)

The present invention relates generally to tobacco harvesting equipment, and more particularly to devices for orienting tobacco leaves before they have been removed from the stalk of the tobacco plant.

Tobacco is harvested by either cutting the entire stalk on which the tobacco leaves grow (which is called stalk cutting) or by picking the leaves individually from time to time as they ripen (called priming). The apparatus set forth in this invention is specifically designed to be used with a tobacco harvester that primes the tobacco leaves.

After the tobacco leaves have been primed from the stalk, it is necessary to cure them. While the form of curing will vary with dicerent types of tobacco, this particular apparatus is designed primarily for use with flue-cured tobaccos which are harvested solely by the priming method and which include five-eighths of United States tobacco crop. After the flue-cured tobaccos are primed (which may include four to six pickings), the leaves are then prepared for hanging in the curing barn by forming the leaves into small groups with the butts of three or four leaves secured together, the groups then being strung onto a stick approximately four and one-half feet long. The priming and subsequent handling for curing require well over half the man hours required to raise one acre of tobacco, it being estimated that approximately 400 man hours are required to raise and harvest one acre of tobacco. This may be contrasted to the average amount of labor, approximately eight hours, needed to raise an acre of wheat.

Various harvesting devices have been proposed in the past to reduce the labor requirements for harvesting flue-cured tobacco. One form of harvesting device is shown in the U.S. patent to Long 2,704,158 issued Mar. 15, 1955. In this form of harvester the workers are carried on a machine past the plants, the workers removing the leaves by hand from the plants and placing them on a conveyor where they are taken to a station where they are then placed on sticks. This form of harvesting apparatus has met with some commercial success but has not materially reduced the man hours required to raise an acre of tobacco.

A second form of harvesting apparatus is shown herein. In this form of tobacco harvester tobacco leaves are primed mechanically from their stalks and conveyed by belts to a collecting device, the leaves subsequently being removed from the collecting device to be formed into groups and placed on sticks. The defoliating mechanisms may be of the type shown in U.S. Patents 2,816,411 to Wilson, 2,834,173 also to Wilson, 2,834,174 to Suggs et al., or 3,093,949 to Splinter. This form of harvester has not been commercially successful since it has been difficult to form the tobacco leaves into groups for placing on sticks after they have been thrown into the collecting means in a helter-skelter fashion. Thus while labor has been reduced in removing the tobacco from the stalks, additional labor has been required for forming the tobacco into oriented groups and placing them on the sticks. Thus the net labor reduction has been negligible.

Another approach is shown in U.S. patent to Wilson, No. 3,083,517 dated Apr. 2, 1963. In the Wilson harvester the leaves are placed into racks for bulk curing which does not require that the leaves be formed into oriented groups. This form of harvester has not met with significant commercial success either since bulk curing has not been widely adopted by the tobacco industry.

The principal object of this invention is to provide an improved apparatus for priming tobacco leaves in which the tobacco leaves are oriented with respect to each other prior to priming so that they may be more easily formed into oriented groups at a subsequent time. Another object of this invention is to provide improved means for priming tobacco leaves from the stalks after they have been oriented.

These and other objects and advantages of this invention will be apparent to those skilled in the art after a consideration of the following detailed description, taken in conjunction with the accompanying drawings, in which the preferred form of this invention is illustrated.

Figure 1:
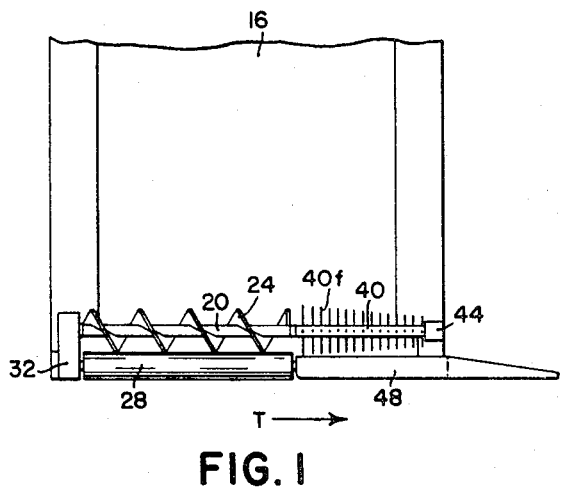
FIG. 1 is a side view of a portion of a tobacco harvester in which the principles of the present invention have been incorporated.
Figure 3:
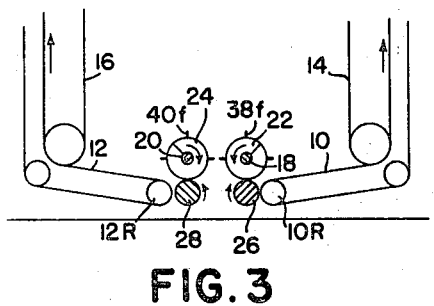
FIG. 3 is a somewhat schematic view taken along the line 3—3 in FIG. 2.
Figure 2:
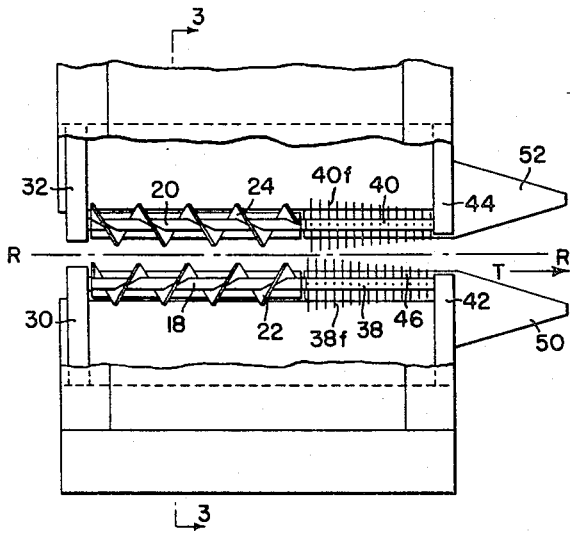
FIG. 2 is a top view of a portion of a tobacco harvester in which the principles of this invention have been illustrated, a portion being broken away to more clearly illustrate the invention.
Figure 4:
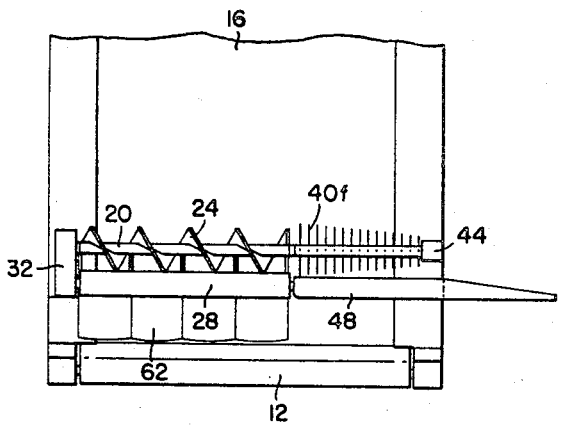
Figure 6:
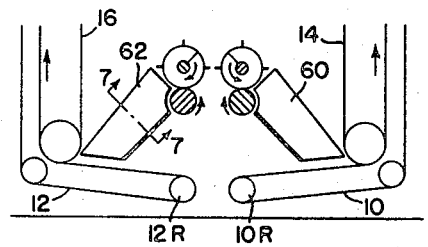
Figure 5:
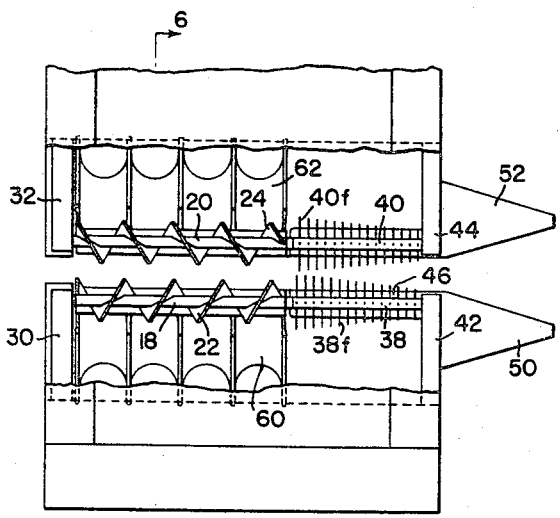

FIGS. 4, 5, and 6 are views corresponding to FIGS. 1, 2, and 3 of a slightly modified form of the invention.

Figure 7:
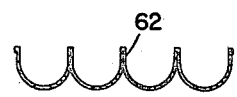

FIG. 7 is a view taken along the line 7—7 in FIG. 6.

While only a portion of a tobacco harvester is illustrated in the figures accompanying this application, it should be noted that this tobacco harvester includes a defoliating or priming station, conveying belts 10, 12, 14, and 16 disposed to either side of the priming station and adapted to convey the leaves from the priming station to a collecting means (not shown). The tobacco harvester is adapted to be propelled forwardly over the ground by a tractor (not shown) and is more fully described in the aforesaid application.

Referring now to FIGS. 1, 2, and 3, one form of novel orienting and defoliating mechanism has been illustrated. It should be noted that while the orienting and defoliating mechanism is illustrated in conjunction with the harvester of the foregoing application, this mechanism may be used with other forms of harvesting equipment and is not restricted for use with the apparatus shown in the aforesaid patent application. The defoliating mechanism includes right- and left-hand opposed rollers 18 and 20 disposed on opposite sides of the row receiving line of the machine (indicated at R—R), each of the rollers 18 and 20 being provided with an outwardly projecting helices 22, 24 which are in contact with right and left lower rollers 26, 28. The lower rollers 26 and 28 are disposed immediately adjacent and between the conveying belt rollers 10R, 12R. The spiral defoliators are driven through a sprocket and chain drive enclosed within the housings 30, 32, this form of drive being more fully illustrated in the aforesaid patent application. The rollers 26 and 28 can be driven through frictional contact with the helices 22, 24 but are preferably driven positively through the same drive that drives the spiral helices 22, 24.

The right and left rollers 18 and 20 are provided with forward extensions 38, 40 that are journaled for rotation with the rollers 18 and 20, respectively, at their forward ends in housings 42, 44. Each of the roller extensions 38, 40 is provided with a plurality of outwardly projecting flexible fingers 38f, 40f. As can best be seen from FIGS. 1 and 2, these fingers are of varying length with the shorter fingers being disposed at the forward end of the rollers 38, 40 adjacent the supports 42, 44 and the longer fingers being disposed adjacent the rollers 18, 20. Rightand left-hand guides 46, 48 are disposed below the rollers 38 and 40, each of the guides being provided with a forward triangularly-shaped portion 50, 52, respectively.

The operation of the machine is as follows: The tobacco harvester is propelled forwardly along a row of tobacco (indicated by the broken line R—R) in the direction of the arrow T. The forward portions 50, 52 of the guides will initially contact any low leaves and raise them so that they will pass along the main portion of the guides 48, 46. The fingers 38f, 40f will comb any leaves that they contact or which are supported on the guides 46, 48 so that the leaves will extend towards the conveying belts 14, 16 while their butts are still attached to the stalks of the tobacco plants in the row. As the machine continues its forward progress, the leaves which have been oriented by the fingers 38f, 40f will then be contacted by the spiral defoliators 22, 24 which will hold the leaves between the spirals 22 or 24 and the associated roller 26 or 28 and pull the leaves from the stalk of the tobacco plant. The leaves will then be deposited upon the upper surface of the conveyor belts 10, 12 for conveying to a tobacco leaf receiving station where they will be deposited in a collecting means in an oriented fashion.

In the modification shown in FIGS. 1, 2, and 3 the tobacco leaves are passed directly from the cooperating rollers 22, 26 and 24, 28 onto the conveying belts 10 and 12. However, after one or two primings of the field have been accomplished, it is necessary to raise the defoliating mechanism above the conveying belts to then prime leaves from a higher portion of the plant. In order to insure that the leaves are maintained in their oriented fashion, specially designed troughs 60, 62 are disposed below and to the sides of the defoliating mechanisms, the troughs receiving the tip ends of the leaves first and holding the leaves in alignment as they slide downwardly toward the belts 10 and 12. In all other respects the apparatus shown in FIGS. 4–7 corresponds to that shown in FIGS. 1–3.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A tobacco harvester having priming means for removing selected tobacco leaves from a row of tobacco plants, leaf orienting means adjacent the priming means to engage said selected tobacco leaves on the plants prior to their removal and to orient them with respect to each other, and means for conveying said removed tobacco leaves away from said priming means to a receiving station.

2. The tobacco harvester set forth in claim 1 in which the leaf orienting means includes a plurality of leaf engaging means normally disposed parallel to the row, said leaf engaging means being movable towards and away from said row.

3. The tobacco harvester set forth in claim 2 in which said leaf engaging means are flexible fingers.

4. The tobacco harvester set forth in claim 1 in which the leaf orienting means move in a closed path about an axis parallel to the row of tobacco plants.

5. The tobacco harvester set forth in claim 1 in which the leaf orienting means includes a pair of opposed rollers disposed on opposite sides of a row of tobacco plants, each of the rollers being provided with a plurality of outwardly extending flexible fingers which are adapted to contact selected leaves and draw them towards the opposed rollers, and means to rotate said rollers.

6. The tobacco harvester set forth in claim 5 in which said fingers are of varying length, the shorter fingers being disposed at the forward end of said rollers and the longer fingers at the rear end of said rollers, said orienting means further including a pair of oppositely disposed triangular guides, a portion of which is disposed forwardly of said rollers and is adapted to lift the tobacco leaves into contact with the fingers on said rollers.

7. The tobacco harvester set forth in claim 1 in which the conveying means includes troughs disposed immediately below the priming means, said troughs maintaining the leaves in an oriented array for subsequent conveying.

8. The tobacco harvester set forth in claim 1 in which said priming means includes a first pair of opposed rollers disposed on opposite sides of a row, each of said first pair of rollers being provided with an outwardly projecting flexible helical leaf engaging means, and a second pair of opposed rollers disposed on opposite sides of a row immediately below said first pair, the helical leaf engaging means being adapted to contact the associated second roller, and means to drive said rollers whereby leaves disposed between rollers of said first and second pairs will be pulled from said plants.

9. The invention set forth in claim 8 in which said leaf orienting means includes a third pair of opposed rollers disposed on opposite sides of a row, each of said third pair of rollers being mounted concentrically with said first pair and including a plurality of outwardly projecting fingers adapted to orient tobacco leaves.

References Cited

UNITED STATES PATENTS

| | | | |
|---|---|---|---|
| 2,660,849 | 12/1953 | Knowles | 56—33 |
| 2,696,069 | 12/1954 | Hawkins | 56—27.5 |
| 2,816,411 | 12/1957 | Wilson | 56—27.5 |
| 3,060,666 | 10/1962 | Kasha | 56—119 |
| 3,093,949 | 6/1963 | Splinter | 56—27.5 |

RUSSELL R. KINSEY, *Primary Examiner.*